US011527091B2

(12) United States Patent
Nonaka

(10) Patent No.: US 11,527,091 B2
(45) Date of Patent: Dec. 13, 2022

(54) ANALYZING APPARATUS, CONTROL METHOD, AND PROGRAM

(71) Applicant: NEC CORPORATION, Tokyo (JP)

(72) Inventor: Tetsushi Nonaka, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 16/830,518

(22) Filed: Mar. 26, 2020

(65) Prior Publication Data
US 2020/0311401 A1    Oct. 1, 2020

(30) Foreign Application Priority Data
Mar. 28, 2019   (JP) .............................. JP2019-063343

(51) Int. Cl.
*G06V 40/10*    (2022.01)
*G06V 20/52*    (2022.01)

(52) U.S. Cl.
CPC ............ *G06V 40/103* (2022.01); *G06V 20/53* (2022.01)

(58) Field of Classification Search
CPC .................................................. G06K 9/00369
USPC ........................................................ 382/115
See application file for complete search history.

(56) References Cited

U.S. PATENT DOCUMENTS

2004/0252194 A1* 12/2004 Lin ........................ H04N 7/181
348/E7.086
2008/0158361 A1* 7/2008 Itoh .................. G08B 13/19671
348/155
2011/0222724 A1* 9/2011 Yang .................... G06V 40/165
382/103
2017/0256044 A1* 9/2017 Maruyama ............. G06V 20/53
2019/0215491 A1* 7/2019 Bouzonnet ............. G06N 20/00

FOREIGN PATENT DOCUMENTS

| JP | 2010-272958 A | 12/2010 |
| JP | 2011-34357 A | 2/2011 |
| JP | 2012-137906 A | 7/2012 |
| JP | 2018-55607 A | 4/2018 |
| JP | 2018-85597 A | 5/2018 |
| JP | 2019-008831 A | 1/2019 |
| WO | 2014/125882 A1 | 8/2014 |

OTHER PUBLICATIONS

Office Action dated Jun. 9, 2020 in Japanese Application No. 2019-063343.
Japanese Office Action for JP Application No. 2020-116114 dated Mar. 9, 2021 with English Translation.

* cited by examiner

*Primary Examiner* — Daniel T Tekle
(74) *Attorney, Agent, or Firm* — Sughrue Mion, PLLC

(57) ABSTRACT

A first camera and a second camera are installed in a facility. An analyzing apparatus detects the same person from a first captured image generated by the first camera and a second captured image generated by the second camera. The analyzing apparatus computes a movement time which is required for the detected person to move between a captured area of the first camera and a captured area of the second camera. The analyzing apparatus determines an attributed of the person using at least one of the first captured image and the second captured image. The analyzing apparatus acquires a reference value corresponding to the determined attribute, compares the computed movement time with the acquired reference value, and outputs output information based on a result of the comparison.

17 Claims, 7 Drawing Sheets

ANALYZING APPARATUS, CONTROL METHOD, AND PROGRAM

BACKGROUND

Technical Field

The present invention relates to behavior analysis using image analysis.

Related Art

A technology is developed for interpreting a behavior of a person using a video or the like of a surveillance camera. Japanese Patent Application Publication No. 2019-8831 discloses a technology for deriving a physical quantity which represents a behavior state of a person who exists in a surveillance target area, and computing a suspicion degree of the person based on a difference between the physical quantity and an average value. Time for existence in the surveillance target area or the like is exemplified as the physical quantity.

SUMMARY

In Japanese Patent Application Publication No. 2019-8831, suspicion degrees of all persons are computed on the basis of a common average value. However, even in a case of normal persons who are not suspicious persons, there may be a large difference between behaviors. For example, in a case of the young and the old, it may be considered that time required to move the same place is greatly different from each other.

The present invention is provided in consideration of the above-mentioned problem, and an object of the present invention is to provide a technology for performing behavior analysis using captured images with higher accuracy.

In one embodiment, there is provided an analyzing apparatus including 1) a detection unit that detects the same person from each of a first captured image, which is generated by a first camera installed in a facility, and a second captured image, which is generated by a second camera installed in the facility; 2) a computation unit that computes a movement time which is required for the person detected by the detection unit to move between a place captured by the first camera and a place captured by the second camera; 3) a determination unit that determines an attribute of the person using at least one of the first captured image and the second captured image; and 4) a comparison unit that acquires a reference value corresponding to the determined attribute, compares the computed movement time with the acquired reference value, and outputs output information based on a result of the comparison.

In another embodiment, there is provided a control method executed by a computer. The control method includes 1) detecting the same person from each of a first captured image, which is generated by a first camera installed in a facility, and a second captured image, which is generated by a second camera installed in the facility; 2) computing a movement time which is required for the person detected in the step of detecting to move between a place captured by the first camera and a place captured by the second camera; 3) determining an attribute of the person using at least one of the first captured image and the second captured image; and 4) acquiring a reference value corresponding to the determined attribute, comparing the computed movement time with the acquired reference value, and outputting output information based on a result of the comparison.

In still another embodiment, there is provided a program causing a computer to execute respective steps of the control method.

According to the present invention, there is provided a technology for performing behavior analysis using captured images with higher accuracy.

BRIEF DESCRIPTION OF THE DRAWINGS

The above and other objects, advantages and features of the present invention will be more apparent from the following description of certain preferred embodiments taken in conjunction with the accompanying drawings, in which.

DETAILED DESCRIPTION

The invention will be now described herein with reference to illustrative embodiments. Those skilled in the art will recognize that many alternative embodiments can be accomplished using the teachings of the present invention and that the invention is not limited to the embodiments illustrated for explanatory purposes.

Hereinafter, an example embodiment of the present invention will be described with reference to the accompanying drawings. Also, the same reference symbols are attached to the same components throughout the drawings, and description will not be repeated. In addition, unless description is particularly performed, each block represents not a configuration in a hardware unit but a configuration in a function unit in each block diagram.

<Outline>

Figure 1:
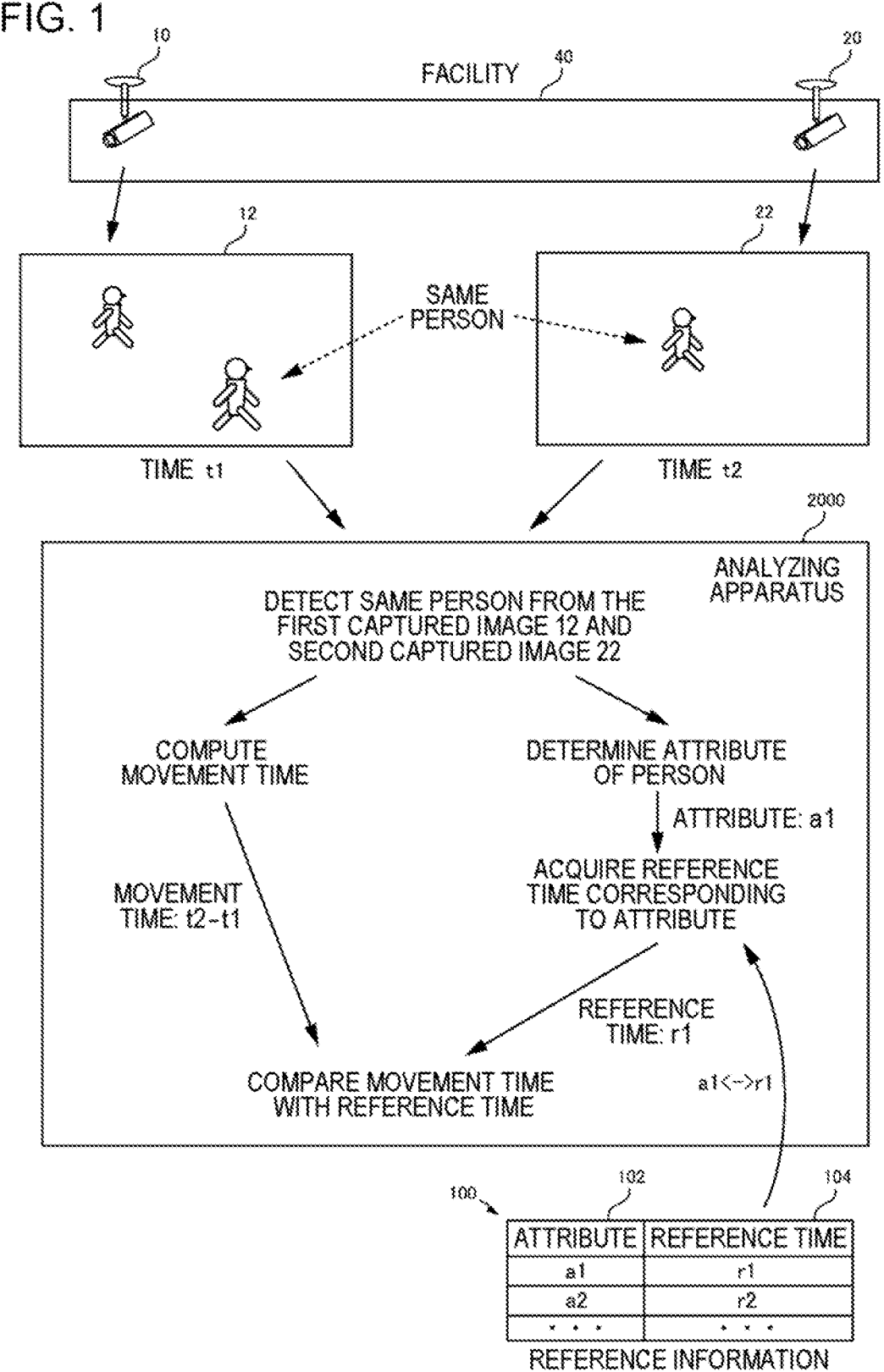
FIG. 1 is a diagram illustrating an outline of an operation of an analyzing apparatus according to a first example embodiment.

FIG. 1 is a diagram illustrating an outline of an operation of an analyzing apparatus 2000 according to a first example embodiment. FIG. 1 is a diagram representing conceptual description for easy understanding of the operation of the analyzing apparatus 2000, and does not specifically limit the operation of the analyzing apparatus 2000.

The analyzing apparatus 2000 performs interpretation of a captured image acquired by a camera installed in a facility 40. At least two cameras (a first camera 10 and a second camera 20) are provided in the facility 40. The first camera 10 and the second camera 20 are installed in respectively different places in the same facility. Note that, "in the facility" is not necessarily limited to an inside of one building. For example, a plurality of buildings or outdoor places (gardens or the like) in the vicinity of the buildings may be included in the facility 40.

Each of the first camera 10 and the second camera 20 generates a plurality of captured images by repeatedly performing a capture. The captured image generated by the first camera 10 is referred to as a first captured image 12, and the captured image generated by the second camera 20 is referred to as a second captured image 22. It is possible to use, for example, a surveillance camera installed in the facility 40, as the first camera 10 or the second camera 20. However, the first camera 10 or the second camera 20 may be a camera which is provided separately from the surveillance camera.

The analyzing apparatus 2000 detects the same person from the first captured image 12 and the second captured image 22. A person who is detected from both the first captured image 12 and the second captured image 22 is referred to as an analysis target person. For the analysis target person, the analyzing apparatus 2000 computes a time (movement time) required for the person to move between a place (a captured area of the first camera 10) captured by the first camera 10 and a place (a captured area of the second camera 20) captured by the second camera 20.

In addition, the analyzing apparatus 2000 determines an attribute of the analysis target person using at least one of the first captured image 12 and the second captured image 22 from which the analysis target person is detected. It is possible to use various attributes, such as age, gender, presence/absence of companions, and the number of companions, as the attribute of the person.

The analyzing apparatus 2000 acquires a reference value of the movement time corresponding to the determined attribute. Hereinafter, the reference value of the movement time is also referred to as a reference time. Association of the attribute with the reference time is previously prepared. Information indicative of the association is referred to as reference information 100. The reference information 100 indicates a reference time 104, which is associated with an attribute 102, as a reference value of a movement time of a person who has the attribute 102. For example, the reference information 100 is stored in a storage device which can be accessed by the analyzing apparatus 2000.

The analyzing apparatus 2000 compares the reference time corresponding to the attribute of the analysis target person with the movement time computed for the analysis target person, and generates output information relevant to a result of the comparison. For example, the analyzing apparatus 2000 decides whether or not the movement time is equal to or longer than the reference time, and generates the output information representing a warning in a case where the movement time is equal to or longer than the reference time. However, a method of comparing the movement time with the reference time and the output information based on the result of the comparison are not limited to examples described here.

For example, in FIG. 1, the analyzing apparatus 2000 detects the same person from the first captured image 12 generated at time t1 and the second captured image 22 generated at time t2, and handles the person as the analysis target person. The analyzing apparatus 2000 computes t2-t1 as the movement time of the analysis target person. In addition, the analyzing apparatus 2000 determines a1 as the attribute of the analysis target person, and acquires r1 which is the reference time 104 associated with the attribute 102 referred to as a1 in the reference information 100. Further, the analyzing apparatus 2000 generates the output information by comparing the movement time t2-t1 with the reference time r1.

Advantageous Effect

It is possible to use a time, in which the person moves in the facility, as various indexes. For example, from a point of view of security, it is possible to detect a person, whose movement time is too long, as a person of interest. In addition, it is possible to realize evaluation of a length of the movement time through comparison with the reference time. For example, a method of "deciding that the movement time is too long in a case where the movement time is longer than the reference time" may be considered.

However, in a case where a common value is used as the reference time for all the persons, it is difficult to appropriately evaluate the length of the movement time. A reason for this is that appropriateness of the movement time of the person depends on the attribute of the person. For example, it is general that a movement time of the old is longer than a movement time of the young. Therefore, in a case where the same reference time is used to evaluate the movement time of the old and the movement time of the young, it is difficult to perform appropriate evaluation.

According to the analyzing apparatus 2000 of the first example embodiment, the movement time of the analysis target person is compared with the reference time decided in association with the attribute of the person. Therefore, rather than a case where the movement time of the analysis target person is compared with the reference time which is common to all the persons, it is possible to perform further appropriate evaluation on the movement time. That is, it is possible to perform behavior analysis of a person with higher accuracy by performing interpretation of the captured image.

Hereinafter, the analyzing apparatus 2000 of the first example embodiment will be described in further detail.

<Example of Functional Configuration of Analyzing Apparatus 2000>

Figure 2:
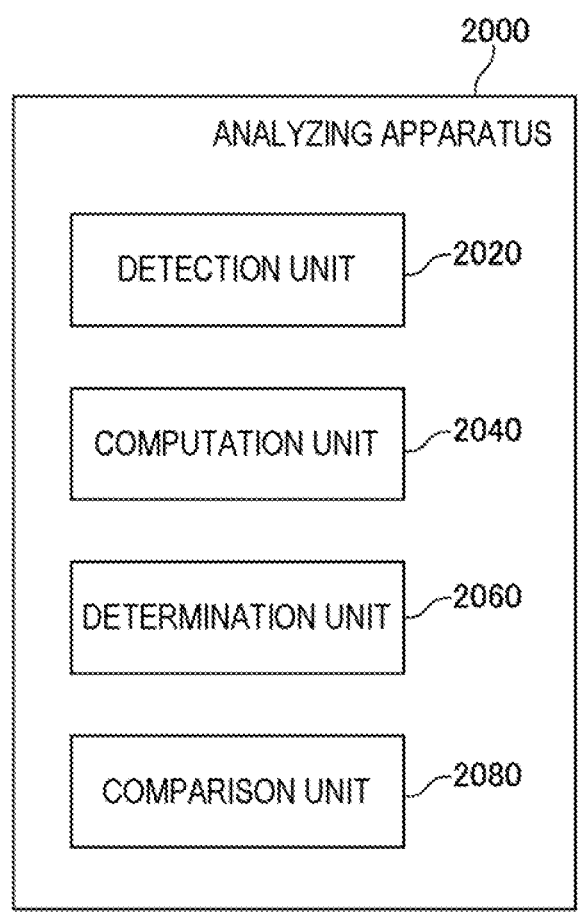
FIG. 2 is a diagram illustrating a configuration of the analyzing apparatus according to the first example embodiment.

FIG. 2 is a diagram illustrating a configuration of the analyzing apparatus 2000 of the first example embodiment. The analyzing apparatus 2000 includes a detection unit 2020, a computation unit 2040, a determination unit 2060, and a comparison unit 2080. The detection unit 2020 detects the same person from the first captured image 12 and the second captured image 22. The person detected from both the first captured image 12 and the second captured image 22 is handled as the analysis target person. The computation unit 2040 computes the movement time required for the analysis target person to move between the captured area of the first camera 10 and the captured area of the second camera 20. The determination unit 2060 determines the attribute of the analysis target person using at least one of the first captured image 12 and the second captured image 22. The comparison unit 2080 acquires the reference time 104 corresponding to the attribute of the analysis target person from the reference information 100. The comparison unit 2080 compares the movement time of the analysis target person with the acquired reference time 104, and generates the output information based on the result of the comparison. The comparison unit 2080 outputs the output information.

<Hardware Configuration of Analyzing Apparatus 2000>

Respective functional components of the analyzing apparatus 2000 may be realized by hardware (for example: a hard-wired electronic circuit or the like) which realizes the respective functional components, or may be realized by a combination of hardware and software (for example: a combination or the like of an electronic circuit and a program which controls the electronic circuit). Hereinafter, a case where the respective functional components of the analyzing apparatus 2000 are realized by the combination of the hardware and the software will be further described.

Figure 3:
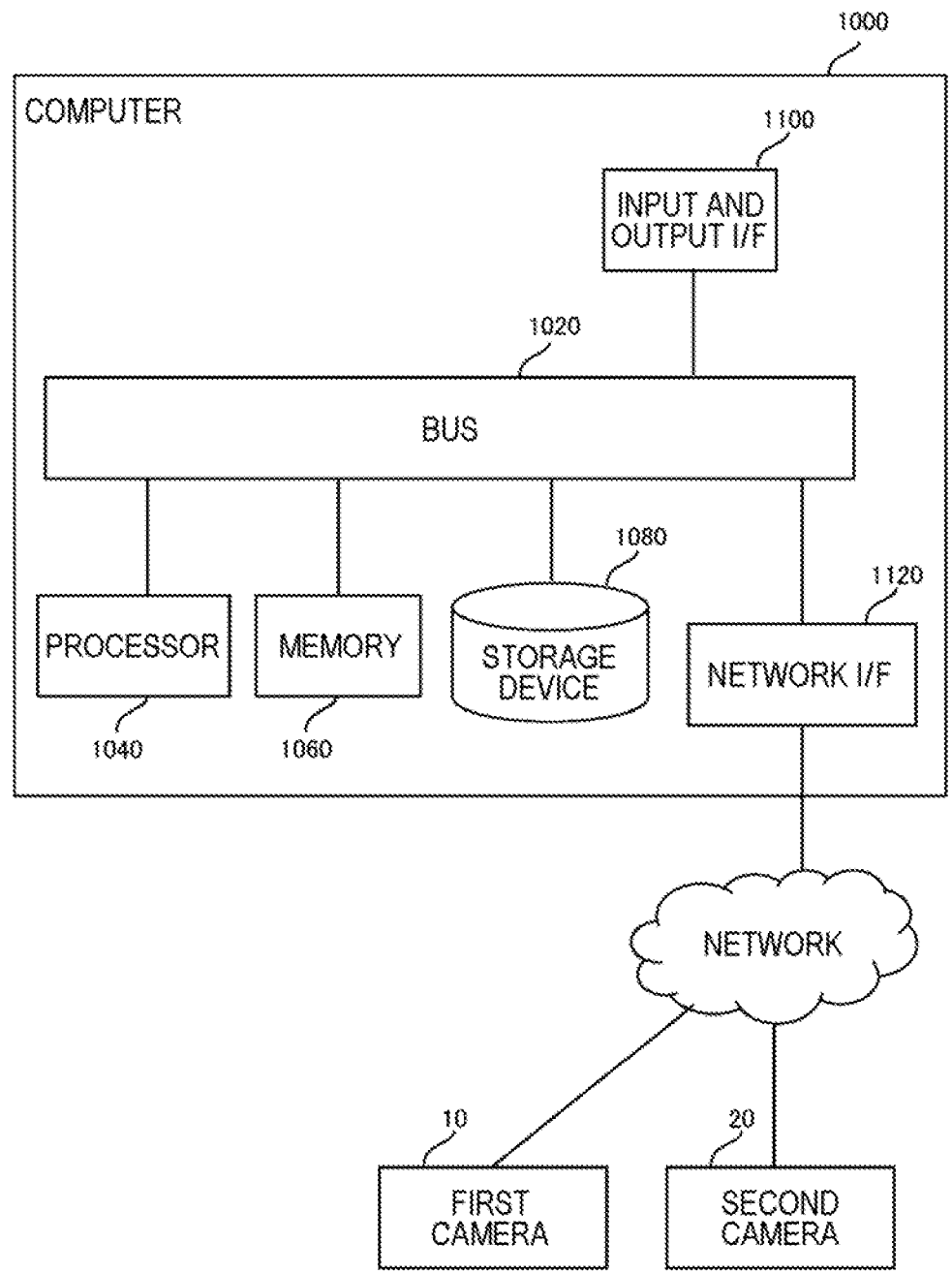
FIG. 3 is a diagram illustrating a computer for realizing the analyzing apparatus.

FIG. 3 is a diagram illustrating a computer 1000 for realizing the analyzing apparatus 2000. The computer 1000 is a random computer. For example, the computer 1000 includes a Personal Computer (PC), a server machine, a tablet terminal, a smart phone, or the like. The computer 1000 may be a dedicated computer designed to realize the analyzing apparatus 2000 or may be a general-purpose computer.

The computer 1000 includes a bus 1020, a processor 1040, a memory 1060, a storage device 1080, an input and output interface 1100, and a network interface 1120. The bus 1020 is a data transmission path for the processor 1040, the memory 1060, the storage device 1080, the input and output interface 1100, and the network interface 1120 to transmit and receive data to and from each other. However, a method of connecting the processor 1040 and the like to each other is not limited to bus connection. The processor 1040 is a processor such as a Central Processing Unit (CPU), a Graphics Processing Unit (GPU), or a Field-Programmable Gate Array (FPGA). The memory 1060 is a main storage device which is realized using a Random Access Memory (RAM) or the like. The storage device 1080 is an auxiliary storage device which is realized using a hard disk drive, a Solid State Drive (SSD), a memory card, a Read Only Memory (ROM), or the like. However, the storage device 1080 may be configured with hardware which is the same as the hardware, such as the RAM, that configures the main storage device.

The input and output interface 1100 is an interface for connecting the computer 1000 to an input and output device. The network interface 1120 is an interface for connecting the computer 1000 to a communication network. The communication network includes, for example, a Local Area Network (LAN) or a Wide Area Network (WAN). A method of connecting to the communication network by the network interface 1120 may include wireless connection or wired connection. For example, the analyzing apparatus 2000 is communicably connected to the first camera 10 and the second camera 20 through the network interface 1120.

The storage device 1080 stores program modules which realize the functional components of the analyzing apparatus 2000. The processor 1040 realizes functions corresponding to the respective program modules by reading and executing the respective program modules in the memory 1060.

For example, the reference information 100 is stored in the storage device 1080. However, the reference information 100 may be stored in a storage device provided on an outside of the analyzing apparatus 2000.

<First Camera 10 and Second Camera 20>

Each of the first camera 10 and the second camera 20 has a function of performing a capture and generating image data which represents a result of the capture. For example, each of the first camera 10 and the second camera 20 generates moving image data. In this case, each of the first captured image 12 and the second captured image 22 is a moving image frame which forms the moving image data. However, the first camera 10 and the second camera 20 may be a still camera configured to repeatedly generate a still image.

Meanwhile, a part of a process described as the process executed by the analyzing apparatus 2000 may be executed by the first camera 10 or the second camera 20. For example, a process of detecting the person from the first captured image 12 (for example, a process of generating detection information which will be described later) may be executed by the first camera 10. In this case, the first camera 10 transmits information relevant to the detected person (for example, the detection information which will be described later) to the analyzing apparatus 2000. The detection unit 2020 recognizes the information relevant to the person detected from the first captured image 12 by receiving the information.

The second camera 20 is the same as above. That is, the second camera 20 may detect the person from the second captured image 22, and may transmit information relevant to the detected person to the analyzing apparatus 2000. The analyzing apparatus 2000 recognizes information relevant to the person detected from the second captured image 22 by receiving the information.

<Example of Usage Scene>

It is possible to use the analyzing apparatus 2000 in various scenes. For example, the analyzing apparatus 2000 is used for person surveillance in various facilities such as an airport and a shopping mall. For example, in a case where a passage is set as a surveillance target, each of the first camera 10 and the second camera 20 is installed in an entrance and an exit of the passage. In this manner, it is possible to perform surveillance on a person who passes through the passage.

For example, the comparison unit 2080 decides whether or not the movement time of the analysis target person is longer than the reference time. In a case where the movement time is longer than the reference time, there is a possibility that the person performs some doubtful behaviors in the middle of the passage from the fact that it takes too long time to move the passage.

Here, in a case where a place, such as a space for changing clothes or a toilet, which requires consideration for privacy, exists in the middle of the passage, it is difficult to directly perform surveillance on the place using the surveillance camera. Here, it is possible to indirectly recognize whether or not the analysis target person performs the doubtful behaviors using a method of comparing a time, which is required to move through the passage, with the reference time.

<Flow of Process>

Figure 4:
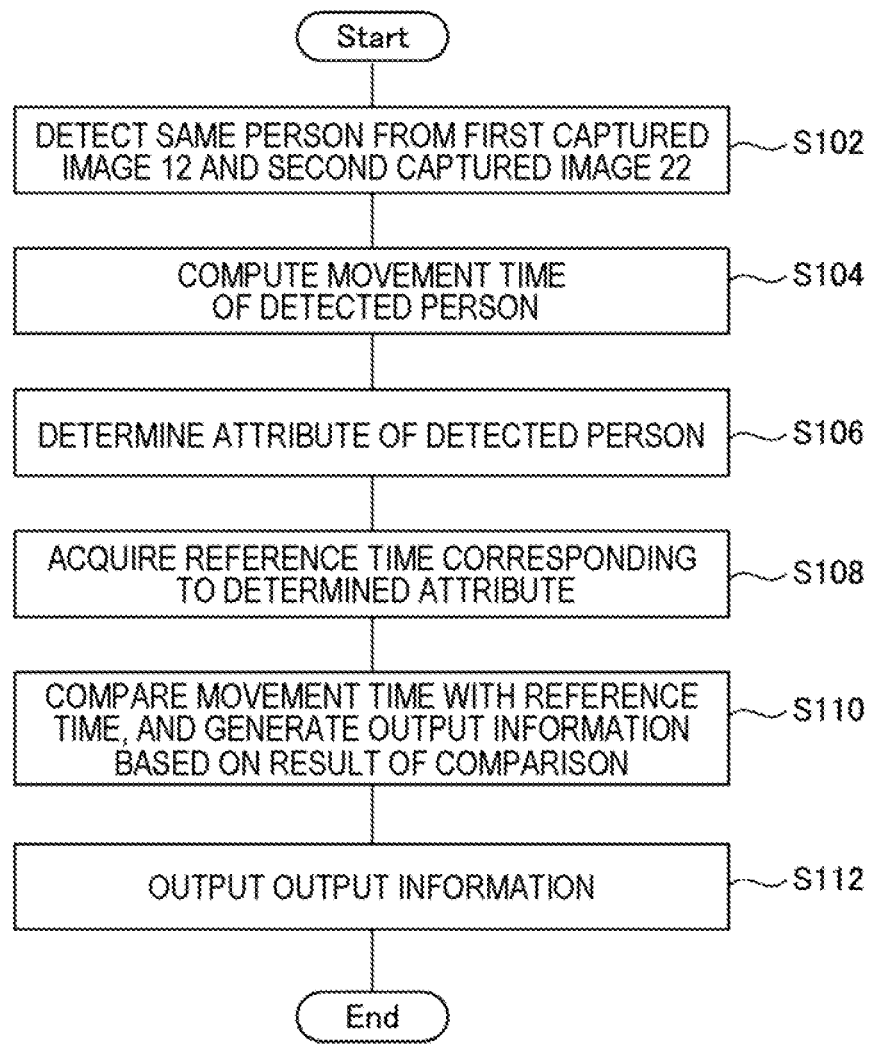
FIG. 4 is a flowchart illustrating a flow of a process executed by the analyzing apparatus according to the first example embodiment.

FIG. 4 is a flowchart illustrating a flow of a process executed by the analyzing apparatus 2000 of the first example embodiment. The detection unit 2020 detects the same person from the first captured image 12 and the second captured image 22 (S102). The computation unit 2040 computes the movement time of the analysis target person (S104). The determination unit 2060 determines the attribute of the analysis target person (S106). The comparison unit 2080 acquires the reference time 104 corresponding to the attribute of the analysis target person from the reference information 100 (S108). The comparison unit 2080 generates the output information by comparing the computed movement time with the acquired reference time 104 (S110). The comparison unit 2080 outputs the output information (S112).

<Method of Acquiring First Captured Image 12>

The detection unit 2020 acquires the first captured image 12. Here, it is possible to use an existing technology as a technology for acquiring the image captured by the camera. For example, whenever the first camera 10 generates a new first captured image 12, the first camera transmits the first captured image 12 to the analyzing apparatus 2000. Further, in a case where the detection unit 2020 receives the first captured image 12 transmitted from the first camera 10, the detection unit 2020 acquires the new first captured image 12. In addition, for example, the first camera 10 may store the first captured image 12 in a storage device which can be accessed from the analyzing apparatus 2000. In this case, for example, the detection unit 2020 periodically accesses the storage device, and acquires the first captured image 12 which is actually acquired.

<Method of Acquiring Second Captured Image 22>

A method of acquiring the second captured image 22 is the same as the method of acquiring the first captured image 12.

<Method of Detecting Same Person from First Captured Image 12 and Second Captured Image 22: S102>

The detection unit 2020 detects the same person from the first captured image 12 and the second captured image 22 (S102). For example, the detection unit 2020 detects the person from the first captured image 12 by executing an object detection process with respect to the first captured image 12. Further, for the detected person, the detection unit 2020 generates information (hereinafter, referred to as "detection information") indicative of association of "an identifier of the first camera 10, an identifier of the person, detection time, an image characteristic of the person".

Here, in a case where the first camera 10 performs the capture a plurality of times while the person passes through the captured area of the first camera 10, the same person may be repeatedly detected from a plurality of the first captured images 12. Here, the detection unit 2020 updates the detection information for the person while the same person is continuously detected from the first captured image 12. Specifically, the detection information is updated by adding a generation time of the first captured image 12, from which the person is detected, and an image characteristic, which is detected from the first captured image 12, to the detection information.

In the same manner, the detection unit 2020 generates the detection information for the person detected from the second captured image 22.

The detection unit 2020 records information of the person who is located in an area (hereinafter, referred to as a target area) between the first camera 10 and the second camera 20. The information is referred to as candidate information. The candidate information includes the detection information for each person who is located in the target area. An identifier of a camera indicated by the detection information in the candidate information is information which indicates the captured area of the first camera 10 or the captured area of the second camera 20, through which the person passes and enters the target area.

For example, in a case where the detection unit 2020 generates the detection information for the person detected from the first captured image 12, the detection unit 2020 decides whether or not detection information for a person who is the same as the detected person is included in the candidate information. It is possible to realize the decision by comparing an image characteristic indicated by the detection information generated using the first captured image 12 with an image characteristic indicated by each piece of detection information included in the candidate information. In a case where the detection information for the person who is the same as the person detected from the first captured image 12 is not included in the candidate information, the detection unit 2020 adds the detection information for the person detected from the first captured image 12 to the candidate information. In this manner, it is possible to record a fact that the person newly enters the target area through the captured area of the first camera 10.

It is assumed that the detection information for the person who is the same as the person detected from the first captured image 12 is included in the candidate information. In this case, the detection unit 2020 decides whether the identifier of the camera indicated by the detection information is the identifier of the first camera 10 or the second camera 20. A case where the identifier is the identifier of the second camera 20 means a fact that the person detected from the first captured image 12 moves from the captured area of the second camera 20 to the captured area of the first camera 10. That is, the case means a fact that the same person is detected from both the first captured image 12 and the second captured image 22. Therefore, the detection unit 2020 determines the person as the analysis target person. Note that, since the person goes out of the target area, the detection unit 2020 deletes the detection information of the person from the candidate information.

In contrast, it is assumed that the detection information for the person who is the same as the person detected from the first captured image 12 is included in the candidate information and an identifier of a camera indicated by the detection information is the identifier of the first camera 10. In this case, after the person passes through the captured area of the first camera 10 and enters the target area, the person passes through the captured area of the first camera 10 again and goes out from the target area without passing through the captured area of the second camera 20. Therefore, it is not possible to compute the movement time for the person. Therefore, the detection unit 2020 does not determine the person as the analysis target person, and deletes the detection information of the person from the candidate information.

In a case where a person is detected from the second captured image 22, the same process is performed. Specifically, in a case where detection information of a person who is the same as the person detected from the second captured image 22 is included in the candidate information and an identifier of a camera indicated by the detection information is the identifier of the first camera 10, the detection unit 2020 determines that the person as the analysis target person. A reason for this is that the case means a fact that, after the person passes through the captured area of the first camera 10 and enters the target area, the person passes through the captured area of the second camera 20 and goes out from the target area. In contrast, in a case where the detection information of the person who is the same as the person detected from the second captured image 22 is included in the candidate information and the identifier of the camera indicated by the detection information is the identifier of the second camera 20, the detection unit 2020 does not determine the person as the analysis target person and deletes the detection information of the person from the candidate information. In addition, in a case where the detection information of the person who is the same as the person detected from the second captured image 22 is not included in the candidate information, the detection unit 2020 adds the detection information generated using the second captured image 22 to the candidate information.

<Method of Computing Movement Time: S104>

The computation unit 2040 computes the movement time of the analysis target person (S104). For example, it is possible to compute the movement time of the analysis target person as a difference (a value acquired by subtracting the earlier time from the later time) between a time at which the analysis target person is detected in a captured range of the first camera 10 and a time at which the analysis target person is detected in a captured range of the second camera 20. Note that, the time, at which the analysis target person is detected in the captured range of the first camera 10, is indicated in the detection information generated using the first captured image 12. In the same manner, the time, at which the analysis target person is detected in the captured range of the second camera 20, is indicated in the detection information generated using the second captured image 22.

Here, in many cases, the analysis target person is included in a plurality of the first captured images 12 and a plurality of the second captured images 22. A reason for this is that it is considered that the camera performs the capture a plurality of times while the analysis target person passes through the captured range of the camera. Therefore, a plurality of detection times are included in the detection information.

It is assumed that the plurality of detection times are included in the detection information generated using the first captured image 12. In this case, the computation unit 2040 determines a time, at which the analysis target person passes through the captured range of the first camera 10, based on the plurality of detection times. For example, the computation unit 2040 handles the latest detection time, the earliest detection time, an average value therebetween, or the like as a time at which the analysis target person passes through the captured range of the first camera 10. A method of determining a time, at which the analysis target person passes through the captured range of the second camera 20, using the detection information generated using the second captured image 22 is the same as above.

<Determination of Attribute: S106>

The determination unit 2060 determines the attribute of the analysis target person (S106). It is possible to use various attributes, such as an age group, the gender, the presence/absence of companions, and the number of companions. Note that, it is possible to use an existing technology as a technology for determining various attributes of the person by interpreting images which include the person.

Here, both or only one of the first captured image 12 and the second captured image 22 may be used to determine the attribute of the analysis target person. In addition, in a case where the analysis target person is included in the plurality of first captured images 12, the determination unit 2060 may determine the attribute using only a part (for example, one) of the plurality of first captured images 12, or may determine the attribute using all the first captured images 12. A case where the second captured image 22 is used is the same as above.

<Reference Information 100>

The reference information 100 indicates the reference time 104 in association with the attribute 102. Here, the reference time 104, which is associated with the attribute 102, may be one time or may be a range of a time. In the latter case, for example, a range of a time "equal to or longer than 10 minutes and equal to or shorter than 15 minutes" is determined as the reference time 104.

In addition, a plurality of reference times 104 may be associated with one attribute 102. For example, three reference times 104 "10 minutes, 20 minutes, and 30 minutes" may be associated with one attribute 102. In this case, for example, the comparison unit 2080 decides any of "shorter than 10 minutes", "equal to or longer than 10 minutes and shorter than 20 minutes", "equal to or longer than 20 minutes and shorter than 30 minutes", and "equal to or longer than 30 minutes" to which the movement time corresponds.

It is possible to use various methods as a method of deciding the reference time 104 corresponding to the attribute 102. For example, a performance value of the movement time is accumulated for each attribute, and the reference time corresponding to the attribute is decided as a statistic value (average value or the like) of the performance value. For example, a test period is provided before the analyzing apparatus 2000 is operated, the analyzing apparatus 2000 is operated while using the facility 40 as a target in the test period, and the movement time is computed and the attribute is determined for each analysis target person. Further, the movement time is accumulated as the performance value corresponding to the attribute. In this manner, it is possible to acquire a plurality of performance values of the movement time in the facility 40 for each attribute. The analyzing apparatus 2000 computes the statistic value of the performance values for each attribute, determines the reference time corresponding to the attribute based on the statistic value, and generates the reference information 100 in which the attribute is associated with the reference time.

For example, the reference time corresponding to the attribute is decided as the statistic value of the performance values acquired for the attribute. In addition, for example, the reference time corresponding to the attribute may be a value acquired by adding or subtracting a prescribed margin to or from the statistic value of the performance values acquired for the attribute. For example, the comparison unit 2080 decides whether or not the movement time is equal to or longer than the reference time, and outputs the output information which represents a warning in a case where the movement time is equal to or longer than the reference time. In this case, it is preferable to set the reference time to the value acquired by adding the prescribed margin to the statistic value of the performance values. In this manner, it is possible to permit a fact that the movement time becomes slightly longer than the statistic value of the performance values.

Here, as described above, the plurality of reference times 104 may be associated with one attribute. In this case, for example, the analyzing apparatus 2000 computes a distribution of the movement time acquired for the attribute, separates the computed distribution into a plurality of ranges, and decides respective boundary values of the respective ranges as the reference times 104. As a method of separating the distribution of the movement time, for example, a method is considered of dividing the distribution of the movement time by a prescribed number such that the number of samples in the movement time becomes equal.

Figure 5:
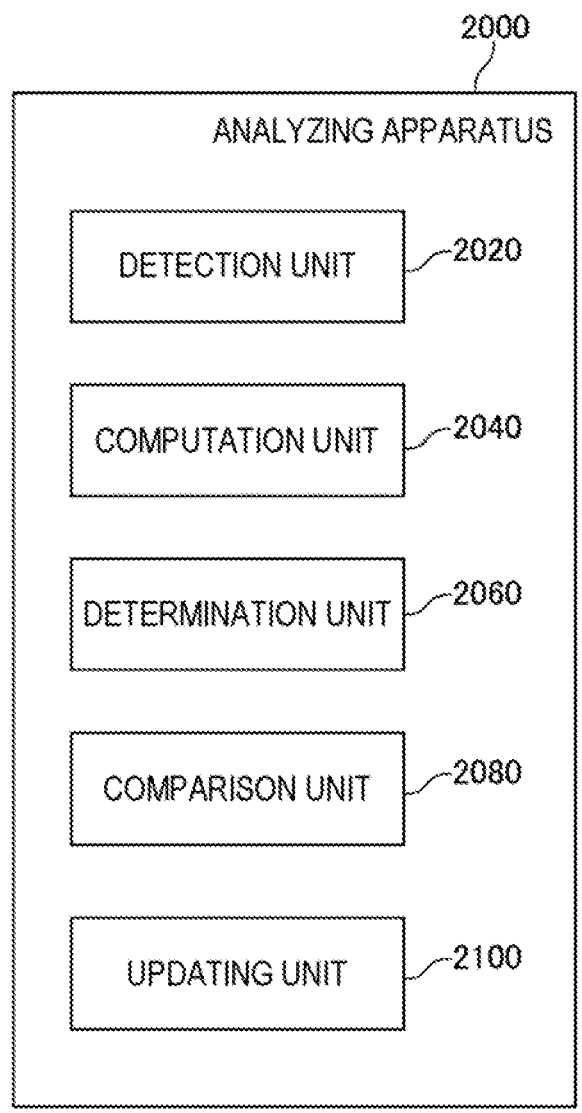
FIG. 5 is a block diagram illustrating a functional configuration of the analyzing apparatus which includes an updating unit.

Note that, after starting the operation of the analyzing apparatus 2000 by generating the reference information 100, the analyzing apparatus 2000 may update the reference information 100 using the movement time computed in a case of the operation. A functional component, which updates the reference information 100, is referred to as an updating unit. FIG. 5 is a block diagram illustrating a functional configuration of the analyzing apparatus 2000 which includes an updating unit 2100.

The updating unit 2100 updates the reference time 104 corresponding to the attribute 102, which matches the attribute determined by the determination unit 2060, using the movement time computed by the computation unit 2040. In order to realize the updating, for example, association of the attribute and the movement time, which are computed during the test period and in the case of the operation, is stored in the storage device. The updating unit 2100 acquires a usage time, which is computed for the attribute determined by the determination unit 2060 up to now, from the storage device. Further, the updating unit 2100 computes a statistic value between each acquired usage time and the usage time newly computed by the computation unit 2040, and updates the reference time 104 using the statistic value. However, in a case of the statistic value, such as the average value, which can be computed in a case where the number of samples is known, it is not necessary to record the whole detailed movement time, and the number of samples for each attribute may be recorded.

A method of deciding the reference time 104 corresponding to the attribute 102 is not limited to a case where the performance value of the movement time is used. For example, the reference time 104 may be manually set up.

<Acquirement of Reference Time: S108>

The comparison unit 2080 acquires the reference time corresponding to the attribute determined by the determination unit 2060 (S108). Specifically, the comparison unit 2080 determines the attribute 102 which matches the attribute of the analysis target person from the reference information 100, and acquires the reference time 104 indicated by the reference information 100. Here, the attribute 102, which matches the attribute of the analysis target person, is the attribute 102, which is the same as the attribute of the analysis target person, or the attribute 102 which includes the attribute of the analysis target person therein. The latter case is, for example, a case where the attribute 102 indicates a range of the attribute and the attribute of the analysis target person is included in the range.

<Comparison of Reference Time with Movement Time and Generation of Output Information: S110>

The comparison unit 2080 performs a comparison of the reference time with the movement time, and generates the output information based on a result of the comparison (S110). Here, it is possible to use various methods for the comparison of the reference time with the movement time. For example, the comparison unit 2080 decides whether or not the movement time is equal to or longer than the reference time. In this manner, it is possible to detect a person whose movement time is too long.

In a case where the movement time of the analysis target person is equal to or longer than the reference time, for example, the comparison unit 2080 generates the output information which represents the warning. The output information includes, for example, a warning message and detail information relevant to detection of the analysis target person. The detail information includes, for example, the detection time, an image of the analysis target person, and the like.

In addition, it is assumed that a plurality of places, which are computing targets of the movement time, exist in the facility 40. That is, a plurality of sets of the first camera 10 and the second camera 20 are provided in the facility 40. In this case, an identifier is allocated to a place (that is, a set of cameras) which is the computing target of the movement time. For example, the identifier is a name which is allocated to the place. It is preferable that the above-described detail information further includes the identifier.

Figure 6:
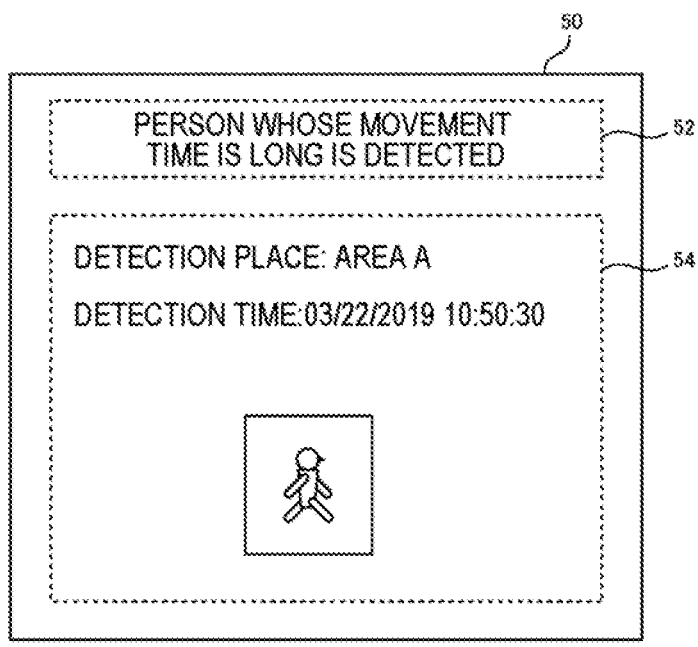
FIG. 6 is a diagram illustrating output information.

FIG. 6 is a diagram illustrating the output information. In FIG. 6, the output information is a warning screen 50. The warning screen 50 illustrates a warning message 52 and detail information 54. The detail information 54 includes a name of a detection place, the detection time, and the image of the analysis target person.

The information included in the detail information 54 is not limited to the information illustrated in FIG. 6. For example, the detail information 54 may further include the attribute of the analysis target person. Here, the detail information 54 may further include the attribute 102, which is decided to match the attribute, in addition to the attribute of the analysis target person. In addition, the detail information 54 may further include the movement time computed for the analysis target person, the reference time which is compared with the movement time, and the like. On this point, an example of FIG. 7 which will be described later is the same as above.

Here, in a case where the movement time is shorter than the reference time, the comparison unit 2080 may or may not output the output information. In a case where the output information is output even though the movement time is shorter than the reference time, it is possible to record the whole result of the comparison for each analysis target person.

The comparison of the reference time with the movement time is not limited to "whether or not the movement time is equal to or longer than the reference time". For example, the comparison unit 2080 may decide whether or not the movement time is equal to or shorter than the reference time. In a case where the movement time is equal to or shorter than the reference time, for example, the comparison unit 2080 outputs the output information which is the same as the above-described warning screen. The reason for this is that, in a case where the movement time is too short, there is a possibility of a situation to be warned, for example, as in a case where a movement unit whose usage is prohibited in the facility 40 is used.

In addition, it is assumed that the reference time indicates the range of the time. In this case, the comparison unit 2080 decides whether or not the range of the time indicated by the reference time includes the movement time. In a case where the range of the time indicated by the reference time does not include the movement time, for example, the comparison unit 2080 outputs the output information which is the same as in the above-described warning screen.

Further, it is assumed that the plurality of reference times 104 are associated with one attribute. In this case, the comparison unit 2080 may compare the movement time with each of the plurality of reference times corresponding to the attribute of the analysis target person. For example, the comparison unit 2080 performs a decision of "whether or not the movement time is equal to or longer than the reference time" using the plurality of acquired reference times in order of shorter time. In a case where the movement time is longer than any of the reference times, the comparison unit 2080 determines the reference time which is initially decided that "the movement time is equal to or longer than the reference time" (that is, the shortest reference time which satisfies "movement time≥reference time"). Note that, in a case where the movement time is shorter than the shortest reference time, the comparison unit 2080 decides that the movement time is shorter than all the reference times.

In a case where the comparison is performed as above, the comparison unit 2080 outputs the output information based on the comparison with the plurality of reference times. For example, warning levels are associated with the reference times. Setting is performed such that a height of the warning level becomes high as the shortest reference time, which satisfies "movement time≥reference time" is long. In this manner, it is possible to recognize a degree (a degree of doubtfulness) to be warned for the person whose movement time is equal to or longer than the reference time.

Figure 7:
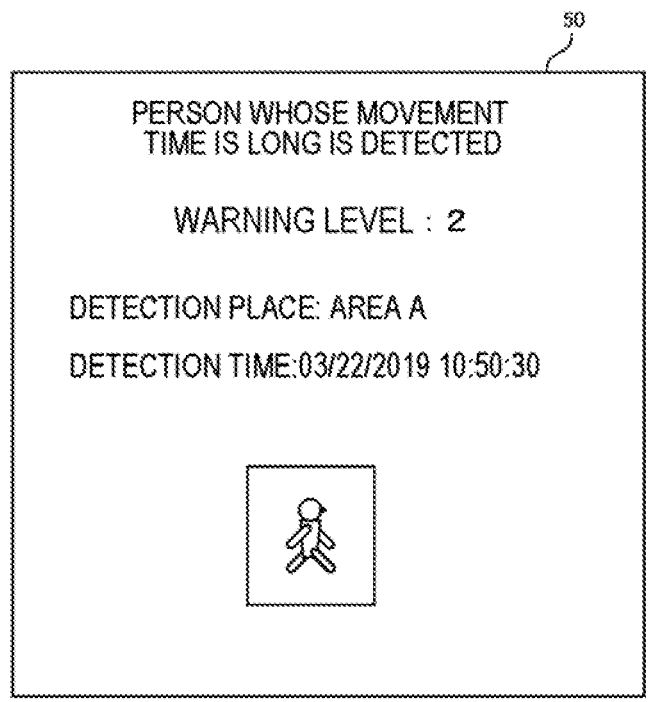
FIG. 7 is a diagram illustrating a warning screen which further includes a warning level.

For example, an association of the reference time with the warning level is decided as "10 minutes: warning level 1", "20 minutes: warning level 2", and "30 minutes: warning level 3". In this case, in a case where the movement time is 25 minutes, the shortest reference value, which satisfies "movement time≥reference value" is 20 minutes. Therefore, the warning level of the analysis target person is 2. FIG. 7 is a diagram illustrating a warning screen which further includes the warning level. Note that, the association of the reference time with the warning level is previously included in the reference information 100.

Note that, an aspect of the output information is not limited to the above-described screen. For example, the output information may be text information or information which is converted into a prescribed table format so as to be recorded in a database.

<<Correction of Reference Time>>

Here, it is expected that a speed of movement of a person differs according to a congestion level (density of persons) of a place to which the person moves. Therefore, the comparison unit 2080 may perform correction in the reference time based on the congestion level of the place to which the person moves, instead of using the reference time without change. For example, the comparison unit 2080 computes the congestion level between the captured range of the first camera 10 and the captured range of the second camera 20, and multiplies a correction coefficient based on the congestion level by the reference time, thereby correcting the reference time. The correction coefficient is a real number which is equal to or larger than 1. Further, the comparison unit 2080 compares the reference time, which is acquired after the correction, with the movement time.

For example, it is possible to decide the congestion degree based on the number of persons who are located between the captured area of the first camera 10 and the captured area of the second camera 20. It is possible to recognize the number of persons who are located between the captured area of the first camera 10 and the captured area of the second camera 20 as the number of pieces of detection information included in the above-described candidate information. In addition, and the number of persons may be determined by, for example, providing another camera such that the capture is performed through overhead view between the first camera 10 and the second camera 20, and perform interpretation on the captured image acquired from the camera.

It is possible to use various methods for computing the correction coefficient. For example, previously, the congestion degree (hereinafter, a reference congestion degree), which becomes the reference, is decided. Further, the comparison unit 2080 uses a value, which is acquired by dividing the congestion degree acquired in a case where the analysis target person is detected by the reference congestion degree, as the correction coefficient. In addition thereto, for example, a function of converting the congestion degree into the correction coefficient is decided, and the correction coefficient may be computed using the function. It is possible to use a random monotone non-decreasing function, which outputs a value equal to or larger than 1, as the function.

Note that, in a case where the correction according to the congestion degree is performed, it is preferable to consider the congestion degree also in a case where the reference information 100 is generated using the performance value of the movement time. For example, in a case where the performance value of the movement time is accumulated, the above-described correction coefficient is computed. Further, the reference time is computed using the statistic value of the value acquired by multiplying the performance value of the movement time by a reverse number of the correction coefficient. In this manner, it is possible to decide the reference time after changing the performance value of the movement time to a predictive value at the congestion level which becomes the reference. That is, it is possible to decide the reference time so as not to be affected by the congestion level in a case where the performance value is computed.

<Output of Output Information: S112>

The comparison unit 2080 outputs the output information (S112). It is possible to output the output information using a random method. For example, the comparison unit 2080 is displayed on a display device which is connected to the analyzing apparatus 2000. In addition, for example, the comparison unit 2080 stores the output information in the prescribed storage device. In addition, for example, the comparison unit 2080 transmits the output information to another device (for example, a mobile terminal or the like possessed by a guard). It is preferable that the output information, which is transmitted to another device, is displayed on a display device included in another device. Note that, it is possible to use an existing technology as a technology for displaying the information, which is transmitted to another device, on the display device included in another device.

Hereinabove, although the first example embodiment of the present invention is described with reference to the accompanying drawings, the first example embodiment is an example of the present invention, and it is possible to use various configurations other than the above.

For example, it is possible to use the analyzing apparatus 2000 for various purposes other than the person surveillance. As an example of another purpose, marketing is exemplified. Specifically, it is possible to recognize a degree of interest of the analysis target person with respect to the facility 40 based on the movement time of the analysis target person.

For example, it is assumed that the facility is a shopping mall. In this case, for each area, such as a children's product store or a women's dress store, the first camera 10 and the second camera 20 are installed at each of different entrance and exit of the area. In this manner, it is possible to recognize, for the analysis target person, the movement time in the area using the analyzing apparatus 2000.

Here, in a case where the analysis target person moves a certain area for a long time, it is highly probable that the person shows an interest in the area. In contrast, in a case where the analysis target person moves the certain area for a short time, it is highly probable that the person does not show the interest in the area. Therefore, it is possible to recognize the degree of interest of the analysis target person by comparing the movement time with the reference time.

Note that, the degree of interest of the analysis target person may be recognized in the same manner as in a case where the warning level is recognized by setting the plurality of reference times 104 so as to correspond to one attribute 102. Specifically, for the plurality of reference times corresponding to one attribute 102, association of a lower interest level is performed as the reference time is shorter. The analyzing apparatus 2000 determines a minimum reference time which satisfies "movement time≥reference time", and determines the interest level corresponding to the determined reference time as the degree of interest of the analysis target person.

Note that, a method of separating an area is not limited to a set of stores, such as the "children's product store", at which similar articles are placed. For example, each store may be set to one area. In this manner, it is possible to recognize the degree of interest of each person in units of a store.

A part or an entirety of the first example embodiment is described as in the following appendix, the present invention is not limited thereto.

1. An analyzing apparatus including: a detection unit that detects the same person from each of a first captured image, which is generated by a first camera installed in a facility, and a second captured image, which is generated by a second camera installed in the facility; a computation unit that computes a movement time which is required for the person detected by the detection unit to move between a place captured by the first camera and a place captured by the second camera; a determination unit that determines an attribute of the person using at least one of the first captured image and the second captured image; and a comparison unit that acquires a reference value corresponding to the determined attribute, compares the computed movement time with the acquired reference value, and outputs output information based on a result of the comparison.

2. The analyzing apparatus according to 1, in which the reference value corresponding to the attribute is a statistic value of movement times required for a plurality of persons having the attribute to move between the place captured by the first camera and the place captured by the second camera.

3. The analyzing apparatus according to 1 or 2, further including: an updating unit that updates the reference value corresponding to the determined attribute using the computed movement time.

4. The analyzing apparatus according to any one of 1 to 3, in which the comparison unit computes a congestion degree of persons between the place captured by the first camera and the place captured by the second camera, corrects the acquired reference value based on the computed congestion degree, and compares the corrected reference value with the computed movement time.

5. The analyzing apparatus according to any one of 1 to 4, in which the comparison unit outputs the output information which represents a warning in a case where the computed movement time is equal to or larger than the acquired reference value.

6. A control method which is executed by a computer, the control method including: detecting the same person from each of a first captured image, which is generated by a first camera installed in a facility, and a second captured image, which is generated by a second camera installed in the facility; computing a movement time which is required for the person detected in the step of detecting to move between a place captured by the first camera and a place captured by the second camera; determining an attribute of the person using at least one of the first captured image and the second captured image; and acquiring a reference value corresponding to the determined attribute, comparing the computed movement time with the acquired reference value, and outputting output information based on a result of the comparison.

7. The control method according to 6, in which the reference value corresponding to the attribute is a statistic value of the movement time required for a plurality of persons having the attribute to move between the place captured by the first camera and the place captured by the second camera.

8. The control method of 6 or 7, further including: updating the reference value corresponding to the determined attribute using the computed movement time.

9. The control method according to any one of 6 to 8, in which the step of comparing includes computing a congestion degree of persons between the place captured by the first camera and the place captured by the second camera; correcting the acquired reference value based on the computed congestion degree; and comparing the corrected reference value with the computed movement time.

10. The control method according to any one of 6 to 9, in which the step of comparing includes outputting the output information which represents a warning in a case where the computed movement time is equal to or larger than the acquired reference value.

11. A program causing a computer to execute respective steps of the control method of any one of 6 to 10.

It is apparent that the present invention is not limited to the above embodiment, and may be modified and changed without departing from the scope and spirit of the invention.

What is claimed is:

1. An analyzing apparatus comprising:
a memory storing instructions; and
at least one processor configured to execute the instructions to perform:
detecting the same person from each of a first captured image, which is generated by a first camera, and a second captured image, which is generated by a second camera;
computing a movement time which is required for the person detected by the detection unit to move between a place captured by the first camera and a place captured by the second camera;
determining an attribute of the person using at least one of the first captured image and the second captured image;
acquiring a reference length of time corresponding to the determined attribute;
comparing the computed movement time with the reference length of time; and
outputting output information based on a result of the comparison.

2. The analyzing apparatus according to claim 1, wherein the reference value corresponding to the attribute is a statistic value of movement times required for a plurality of persons having the attribute to move between the place captured by the first camera and the place captured by the second camera.

3. The analyzing apparatus according to claim 1, wherein the at least one processor is further configured to execute the instructions to perform updating the reference value corresponding to the determined attribute using the computed movement time.

4. The analyzing apparatus according to claim 1, wherein the at least one processor is further configured to execute the instructions to perform:
computing a congestion degree of persons between the place captured by the first camera and the place captured by the second camera;
correcting the acquired reference value based on the computed congestion degree; and
comparing the corrected reference value with the computed movement time.

5. The analyzing apparatus according to claim 1, wherein the at least one processor is further configured to execute the instructions to perform outputting the output information which represents a warning in a case where the computed movement time is equal to or larger than the acquired reference value.

6. The analyzing apparatus according to claim 1, wherein the first camera and the second camera are installed in the same facility.

7. The analyzing apparatus according to claim 1, wherein the at least one processor is further configured to execute the instructions to perform outputting evaluation information of a length of the movement time based on a result of the comparison.

8. A control method which is executed by a computer, the control method comprising:
    detecting the same person from each of a first captured image, which is generated by a first camera, and a second captured image, which is generated by a second camera;
    computing a movement time which is required for the person detected in the step of detecting to move between a place captured by the first camera and a place captured by the second camera;
    determining an attribute of the person using at least one of the first captured image and the second captured image;
    acquiring a reference length of time corresponding to the determined attribute;
    comparing the computed movement time with the reference length of time; and
    outputting output information based on a result of the comparison.

9. The control method according to claim 8,
    wherein the reference value corresponding to the attribute is a statistic value of movement times required for a plurality of persons having the attribute to move between the place captured by the first camera and the place captured by the second camera.

10. The control method according to claim 8, further comprising:
    updating the reference value corresponding to the determined attribute using the computed movement time.

11. The control method according to claim 8,
    wherein the step of comparing includes computing a congestion degree of persons between the place captured by the first camera and the place captured by the second camera;
    correcting the acquired reference value based on the computed congestion degree; and
    comparing the corrected reference value with the computed movement time.

12. The control method according to claim 8,
    wherein the step of comparing includes outputting the output information which represents a warning in a case where the computed movement time is equal to or larger than the acquired reference value.

13. The control method according to claim 8, wherein the first camera and the second camera are installed in the same facility.

14. The control method according to claim 8, wherein the method further comprises outputting evaluation information of a length of the movement time based on a result of the comparison.

15. A non-transitory computer-readable storage medium storing a program causing a computer to execute the control method according to claim 8.

16. The non-transitory computer-readable storage medium according to claim 15, wherein the first camera and the second camera are installed in the same facility.

17. The non-transitory computer-readable storage medium to claim 15, wherein the method further comprises outputting evaluation information of a length of the movement time based on a result of the comparison.

* * * * *